US010239420B2

(12) United States Patent
Yetukuri et al.

(10) Patent No.: US 10,239,420 B2
(45) Date of Patent: Mar. 26, 2019

(54) SYSTEM AND METHOD FOR POSITIONING A VEHICLE SEAT

(71) Applicant: LEAR CORPORATION, Southfield, MI (US)

(72) Inventors: Arjun Yetukuri, Rochester Hills, MI (US); Mladen Humer, West Bloomfield, MI (US); Karl Henn, New Hudson, MI (US); Jasmine Pizana, Scottville, MI (US); Curtis Hudson, Macomb, MI (US)

(73) Assignee: Lear Corporation, Southfield, MI (US)

( * ) Notice: Subject to any disclaimer, the term of this patent is extended or adjusted under 35 U.S.C. 154(b) by 139 days.

(21) Appl. No.: 15/383,361

(22) Filed: Dec. 19, 2016

(65) Prior Publication Data

US 2018/0170215 A1 Jun. 21, 2018

(51) Int. Cl.
| | |
|---|---|
| *B60N 2/02* | (2006.01) |
| *B60N 2/06* | (2006.01) |
| *B60N 2/20* | (2006.01) |
| *B60N 2/42* | (2006.01) |
| *B60N 2/427* | (2006.01) |

(52) U.S. Cl.
CPC ............. *B60N 2/0276* (2013.01); *B60N 2/06* (2013.01); *B60N 2/20* (2013.01); *B60N 2/4228* (2013.01); *B60N 2/4279* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,304,179 | B1 * | 10/2001 | Lotito | ..................... G01S 7/521 280/728.1 |
| 7,387,184 | B2 | 6/2008 | Bethge et al. | |
| 7,479,749 | B2 | 1/2009 | Gerding et al. | |
| 7,755,233 | B2 | 7/2010 | Reimann et al. | |
| 7,881,842 | B2 | 2/2011 | Kuttenberger et al. | |
| 8,393,667 | B2 * | 3/2013 | Hashimoto | .......... B60N 2/0276 296/65.16 |
| 8,630,772 | B2 * | 1/2014 | Ieda | .................... B60R 21/0134 280/735 |
| 10,011,194 | B1 | 7/2018 | Scott et al. | |

(Continued)

FOREIGN PATENT DOCUMENTS

| | | |
|---|---|---|
| CN | 101396978 B | 5/2013 |
| DE | 4323543 C1 | 10/1994 |

(Continued)

OTHER PUBLICATIONS

Office Action dated Sep. 5, 2018 re German Patent App. No. 10 2017 214 803.9.

*Primary Examiner* — Redhwan K Mawari
(74) *Attorney, Agent, or Firm* — Brooks Kushman P.C.

(57) ABSTRACT

A system and method for positioning a seat arrangement in a vehicle includes moving the seat arrangement forward by a first amount when a certain criteria are met. The criteria may include at least one criterion related to occupancy of a seat directly behind the seat arrangement and at least one criterion related to a likelihood of an impact into the vehicle from behind the seat arrangement. The method may also include not moving the seat arrangement forward by the first amount when at least one of the criteria is not met.

21 Claims, 5 Drawing Sheets

(56) References Cited

U.S. PATENT DOCUMENTS

| | | | |
|---|---|---|---|
| 2002/0147535 A1* | 10/2002 | Nikolov | B60N 2/4214 701/45 |
| 2004/0066027 A1* | 4/2004 | Ingemarsson | B60R 21/0134 280/805 |
| 2005/0023810 A1* | 2/2005 | Basir | B60R 21/01532 280/735 |
| 2010/0313698 A1* | 12/2010 | Yoshida | B60R 21/09 74/512 |
| 2010/0327626 A1* | 12/2010 | Baumann | B62D 21/15 296/187.09 |
| 2011/0031780 A1* | 2/2011 | Baumann | B60N 2/01 296/187.12 |
| 2011/0074190 A1* | 3/2011 | Hashimoto | B60N 2/0276 297/216.1 |
| 2011/0098893 A1* | 4/2011 | Hashimoto | B60N 2/0276 701/46 |
| 2011/0221247 A1* | 9/2011 | Hashimoto | B60N 2/0232 297/216.13 |
| 2013/0099908 A1* | 4/2013 | Salonnonsson | B60R 21/0134 340/425.5 |
| 2016/0121834 A1* | 5/2016 | Kufer | B60R 21/0134 701/45 |
| 2016/0176322 A1* | 6/2016 | Frommann | B60N 2/42709 701/45 |
| 2016/0368445 A1 | 12/2016 | Foltin | |
| 2016/0377508 A1* | 12/2016 | Perrone | G01M 17/06 180/204 |
| 2018/0170215 A1* | 6/2018 | Yetukuri | B60N 2/0276 |

FOREIGN PATENT DOCUMENTS

| | | |
|---|---|---|
| DE | 10037069 A1 | 2/2002 |
| DE | 102004046360 A1 | 3/2006 |
| DE | 102007002185 A1 | 7/2008 |
| DE | 102011101150 A1 | 11/2012 |
| DE | 102011102088 A1 | 11/2012 |
| DE | 102011122203 A1 | 6/2013 |
| DE | 112010005767 A5 | 7/2013 |
| DE | 102014005572 A1 | 11/2014 |
| DE | 102014223618 A1 | 5/2016 |
| EP | 2610178 A2 | 7/2013 |
| EP | 1783007 B1 | 4/2014 |
| FR | 2921595 B1 | 1/2016 |

* cited by examiner

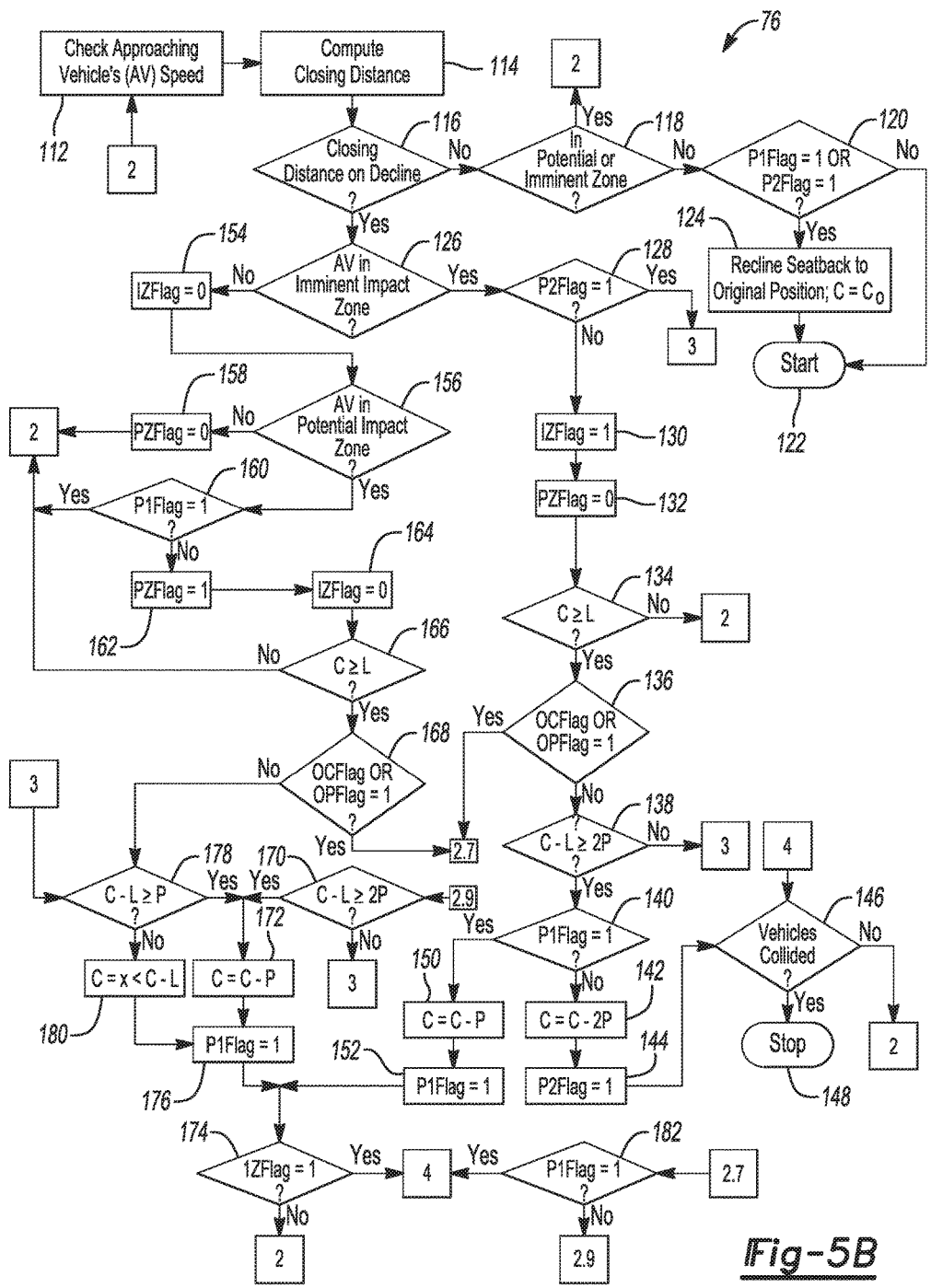

SYSTEM AND METHOD FOR POSITIONING A VEHICLE SEAT

TECHNICAL FIELD

The present disclosure relates to a system and method for positioning a vehicle seat.

BACKGROUND

A number of systems and methods exist for adjusting or otherwise moving a seat in a vehicle into a desired position based on the occurrence of one or more events, such as an impact by another vehicle. Examples of such systems and methods may be found in one or more of the following references: US20160121834A1, DE102011102088A1, DE102011122203A1, and DE102007002185A1.

SUMMARY

At least some embodiments described herein may include a method for positioning a seat arrangement in a vehicle that includes moving the seat arrangement forward when a seat directly behind the seat arrangement is occupied and at least one criterion indicates a likelihood of and impact into the vehicle from behind the seat arrangement. The method may also include not moving the seat arrangement forward when the seat directly behind the seat arrangement is not occupied and the at least one criterion indicates the likelihood of a rear impact into the vehicle.

At least some embodiments described herein may include a method for positioning a seat arrangement in a vehicle that includes moving the seat arrangement forward by a first amount when a plurality of criteria are met. The criteria may include at least one criterion related to occupancy of a seat directly behind the seat arrangement and at least one criterion related to a likelihood of an impact into the vehicle from behind the seat arrangement. The method may also include not moving the seat arrangement forward by the first amount when at least one of the criteria is not met.

At least some embodiments described herein may include a system for positioning a seat arrangement in a vehicle. The system may include a control system including at least one controller and configured to control a position of the seat arrangement based on a plurality of inputs. The control system may be configured to move the seat arrangement forward by a first amount based on at least one input indicative of occupancy of a seat directly behind the seat arrangement and at least one input indicative of a likelihood of an impact into the vehicle from behind the seat arrangement.

BRIEF DESCRIPTION OF THE DRAWINGS

FIG. 5B shows the remainder of the flowchart from FIG. 5A.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
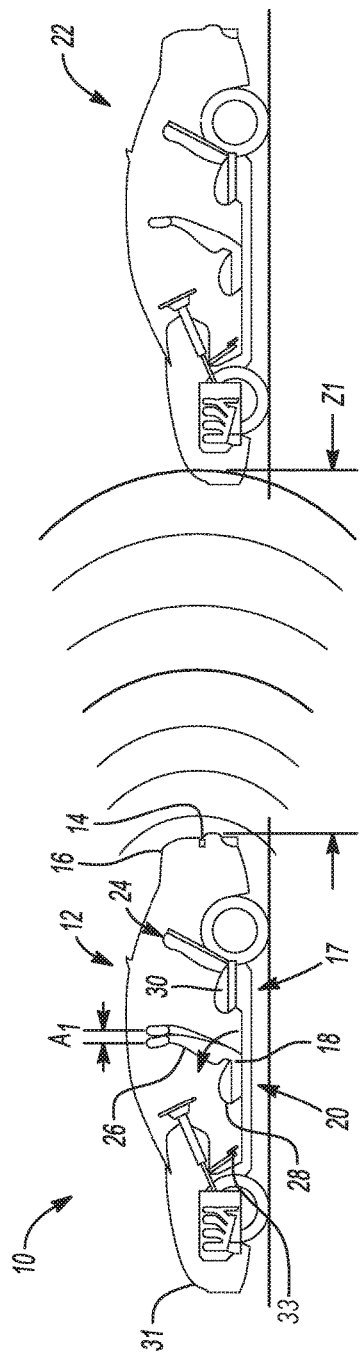
FIG. 1 shows a vehicle having a system for positioning a seat arrangement in accordance with embodiments described herein, and an approaching vehicle reaching a first impact zone.

FIG. 1 shows a vehicle 10 that includes a system 12 for positioning a seat arrangement in accordance with embodiments described herein. The system 12 may include a number of components working together to analyze information and to take specific actions. For example, in the embodiment shown in FIG. 1, the system 12 includes a sensor arrangement 14 generally facing toward a rear 16 of the vehicle 10. The sensor arrangement 14 may include one or more sensor systems such as radar, laser distance measuring systems such as LIDAR, cameras, or other sensor systems that provide information related to conditions around the vehicle 10, such as behind it or on the sides.

The system 12 also includes a control system 17 having a controller 18 embedded within a seat arrangement, which in this embodiment is a front seat 20 of the vehicle 10, and includes a seat back 26 and a seat cushion 28. The controller 18 may have one or more processors, memory, and supporting circuitry to receive inputs and send output signals in accordance with embodiments described herein. The controller 18 may be a memory module of the kind used to retain seat position preferences for the occupants, or it may be a dedicated controller. In the embodiment illustrated in FIG. 1, signals from the sensor arrangement 14 are communicated with the control system 17, and more particularly the controller 18, and either or both of the sensor arrangement 14 and the controller 18 may communicate with other controllers or control systems within the vehicle 10, such as vehicle system controllers, through a communications network— e.g., a controller area network. In addition to the sensor arrangement 14, other sensors and sensor systems of the system 12 may work alone or in conjunction with the sensor arrangement 14 and the controller 18.

As shown in FIG. 1, there is an object, or more particularly a vehicle 22, approaching the vehicle 10 from behind. Based on inputs from the sensor arrangement 14, the controller 18, alone or in conjunction with a larger control system, has determined that the approaching vehicle 22 has reached a first impact zone indicated in FIG. 1 as (Z1). Although the first impact zone (Z1) is illustrated as a distance in FIG. 1, the actual distance to the rear 16 of the vehicle 10 may vary for the first impact zone depending on a number of factors, including the speed of the approaching vehicle 22 relative to the speed of the vehicle 10, whether either or both of the vehicles 10, 22 are accelerating, and generally whether the distance between the vehicle 10 and the vehicle 22 is increasing or decreasing. In at least some embodiments, the first impact zone may be defined based on a "time-to-impact" and may be, for example, approximately 1200 milliseconds (ms). The first impact zone (Z1) may be conveniently referred to as a "potential impact zone" because the information provided by the sensor arrangement 14 indicates that there is at least some likelihood that an impact to the rear 16 of the vehicle 10 may occur.

Figure 2:
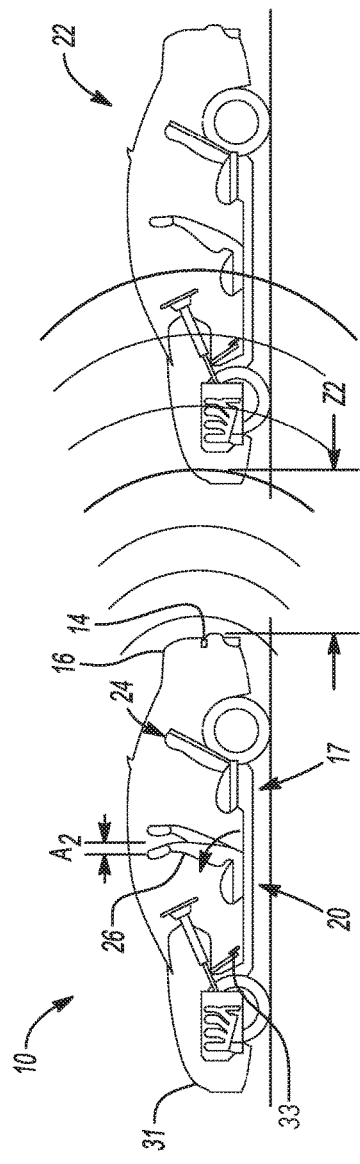
FIG. 2 shows the vehicle from FIG. 1 and an approaching vehicle reaching a second impact zone.

By comparison, FIG. 2 shows the approaching vehicle 22 closer to the vehicle 10, and more particularly, that the approaching vehicle 22 has reached a second impact zone indicated in FIG. 2 as (Z2). Within the second impact zone (Z2), the likelihood that the approaching vehicle 22 will impact the vehicle 10 is greater, and therefore the second impact zone may be conveniently referred to as an "imminent impact zone". Similar to the first impact zone (Z1), the second impact zone may be measured by a time-to-impact rather than a distance, and in some embodiments may be approximately 600 ms. As described in more detail below, impact zones, such as the first and second impact zones (Z1), (Z2), may also be defined on the sides of a vehicle, such as the vehicle 10. In this way, if a seat is facing a direction other than the front of the vehicle, information regarding an impact into the vehicle from behind the seat may still be processed and used to reposition the seat.

The control system 17 may take certain actions based on a number of inputs, including inputs from the sensor arrangement 14. Other inputs may include, for example, inputs from sensors embedded within the front seat 20 or another seat arrangement, such as a rear seat 24. The seat sensors may indicate whether the respective seat 20, 24 is occupied, what its position is, or both. With regard to position, the seat sensors may indicate a longitudinal position of the entire seat, such as the seat 20 or the seat 24, or they may indicate an angular position of a seat back relative to a seat cushion—see, e.g., the seat back 26 and the seat cushion 28 of the seat 20. In addition to or instead of receiving inputs from sensors embedded within the seats 20, 24, the control system 17 may receive inputs from lasers, cameras, or other sensor systems that provide information regarding whether one or both of the seats 20, 24 is occupied. As used herein, a seat may be "occupied" by a person sitting on the seat cushion; it may be occupied by an infant in a child carrier seat, a child sitting in a booster seat, or even by an object or objects occupying space relative to the seat cushion and seat back. In at least some embodiments, the system may proceed on an assumption that a seat such as the rear seat 24 is occupied.

In the embodiment shown in FIGS. 1 and 2, the seat 24 is directly behind the seat 20, and information regarding the occupancy of one or both of the seats 20, 24 may be used as part of a system and method of seat positioning in accordance with embodiments described herein. The term "directly behind" as used in relation to forward and rearward seats described herein is not limited to a rearward seat that is perfectly centered on the seat in front of it. Rather, the term also describes seats that may be somewhat offset from each other, such as in the case of a rearward center seat whose occupant may be partially exposed to rearward movement of a driver-side or passenger-side seat positioned in the row in front of it. Any position of a rearward seat relative to a seat in front of it may be considered "directly behind" for describing embodiments herein when an occupant in the rearward seat may be at least partially in-line with rearward movement of the seat in front of it.

During a rear impact it may be undesirable to have a forward seat, such as the seat 20, positioned close to the seat directly behind it, such as the seat 24; therefore, embodiments described herein provide a system and method of positioning the forward seat, or more particularly reposi- tioning the forward seat, to a more desirable position relative to the seat behind it. Although a first-row seat 20 and a second-row seat 24 are used in this example, embodiments described herein contemplate the use of systems and methods for any two seats disposed forward and rearward of each other—e.g., a second-row seat being a forward seat relative to a third-row seat, and so on. In the embodiments illustrated in FIGS. 1 and 2, the system 12, and in particular the control system 17, is configured to control the position of the seat 20 in response to a number of inputs. These inputs provide a number of criteria that are used to make decisions on how a method implemented by the control system 17 proceeds.

As shown in FIG. 1, the approaching vehicle 22 has reached the first impact zone (Z1). This is an example of a criterion that indicates a likelihood of a rear impact of the approaching vehicle 22 into the vehicle 10. In the embodiment shown in FIG. 1, this single criterion is not enough for the control system 17 to reposition the seat 20. In this embodiment, another input is provided to the control system 17 from a seat sensor 30 embedded in the rear seat 24. When the information received by the control system 17 indicates that the approaching vehicle 22 is within the first impact zone (Z1), and that the rear seat 24 is occupied, two criteria are met, and the control system 17 proceeds to reposition the front seat 20. In some embodiments, this repositioning may include moving the seat 20 longitudinally forward in the vehicle, but in the embodiment illustrated in FIG. 1, the method executed by the control system 17 adjusts the angle of the seat back 26 forward relative to the seat cushion 28. Therefore "moving" a seat arrangement, such as the seat arrangement 20, may include moving the seat back and seat cushion together longitudinally or it may include moving the seat back only by pivoting it relative to the seat cushion; in some embodiments, it may include both longitudinal and pivoting movements.

When a seat back, such as the seat back 26 is pivoted forward, it is not necessary for the entire seat back 26 to be pivoted. Rather, pivoting a seat back forward as described herein may include pivoting only a portion of the seat back forward—e.g., a thoracic and head restraint portion only may be pivoted, while a lumbar portion remains stationary. Unless otherwise specifically defined herein, a seat is moved "forward" when it is moved in a forward direction relative to its own orientation. As shown in FIGS. 1 and 2, the forward direction of the seats 20, 24 coincides with the forward direction of the vehicle 10; however, embodiments described herein contemplate arrangements where the forward movement of the seat does not coincide with a forward direction of the vehicle—see, e.g., the description below in conjunction with FIGS. 3A-3C.

In the embodiment shown in FIG. 1, the seat back 26 is moved forward by a first amount ($A_1$), which is an angle of rotation. Although the amount by which the seat back 26 is rotated forward may vary depending on the seat, the vehicle type, and any of a number of other factors, in at least some embodiments, the amount ($A_1$) may be approximately 9°. As described above, the first impact zone (Z1) may be defined by a time-to-impact of approximately 1200 ms, and the second impact zone may be defined by a time-to-impact of approximately 600 ms; therefore, in at least some embodiments, the seat back 26 may be rotated forward by 9° within 600 ms, thereby completing the seat repositioning while the approaching vehicle 22 is still in the first impact zone and has not yet entered the second impact zone. In at least some embodiments, accelerator pedal 33 is disengaged when the seat back 26 is moved forward. The control system 17 may communicate seat-back movement to a vehicle system controller or other controller to effect the disengagement.

In this embodiment, the seat 20 is moved forward by rotating its seat back 26 forward when the sensor 30 indicates that the seat 24 is occupied and there is a likelihood of a rear impact of the vehicle 10. If either one of these two criteria is not met, then the seat 20 is not moved forward, even if the other criterion is met. In some embodiments, this may be the extent of the repositioning performed when a control system executes a preprogrammed method. In this embodiment, however, additional steps may be taken. For example, certain mechanical features of the seat 24 may be adjusted, such as bladders, lumbar supports, or other support structures to ensure that the seat and its support structures are all in desired positions. And as described below, some embodiments may move the seat back 26 forward a second time after it has previously been moved an initial time as described above.

As is shown in FIG. 2, the approaching vehicle 22 has reached the second impact zone (Z2). As previously indicated by the sensor 30, the rear seat 24 is occupied, and in this embodiment the seat 20 is moved forward a second time. More specifically, the seat back 26 is moved forward by a second amount ($A_2$) as part of the second stage of a two-stage process of moving the seat 20 forward. In some embodiments, the first and second predetermined amounts ($A_1$), ($A_2$) may be different from each other, while in other embodiments they may represent the same angle, or linear distance in the case where a seat is moved forward longitudinally. The initial movement by the first amount ($A_1$) and the movement by the second amount ($A_2$) may occur as discrete events with some time elapsing between them. Alternatively, the initial movement by the first amount ($A_1$) and the movement by the second amount ($A_2$) may occur as a single, continuous movement. The movement by the first amount ($A_1$) may occur with a certain acceleration, while the movement by the second amount ($A_2$) may occur at the same or at a different acceleration.

In the embodiment illustrated in FIGS. 1 and 2, the second predetermined amount ($A_2$) may also be approximately 9°, although it may be implemented somewhat more quickly than the initial repositioning described above. For example, if the first repositioning ($A_1$) takes place within 600 ms, and the approaching vehicle 22 has now reached the second impact zone (Z2), there are approximately 600 ms remaining before the approaching vehicle 22 impacts the vehicle 10—assuming that the vehicles continue on their current courses. Although the seat back 26 may be moved by the second amount ($A_2$) as soon as the approaching vehicle 22 reaches the second impact the zone (Z2), in at least some embodiments, a slight delay may be introduced to determine if the approaching vehicle 22 is deviating from its course—e.g., in direction or speed—before the seat-back 26 is repositioned the second time.

If, within a predetermined amount of time, it is determined that the approaching vehicle 22 has deviated in some way from its calculated impact with the vehicle 10, the seat back 26 may not be moved by the second amount ($A_2$). Conversely, if it is determined that the approaching vehicle 22 has not had deviated from its calculated impact with the vehicle 10 within the predetermined amount of time, the seat back 26 may be moved by the second amount ($A_2$). For example, a delay of approximately 200 ms may be introduced such that the seat back 26 is repositioned the second time when the time-to-impact is calculated as approximately 400 ms. Therefore, in this embodiment, the seat back 26 is repositioned by the second amount ($A_2$) of approximately 9° in about 400 ms. As an adjunct to moving the seat 20, embodiments described herein may also include visual, audible, or haptic indicators for a seated occupant so that they are alerted to the impending automatic movement of the seat; these indicators may be used on the first stage of repositioning, the second stage, or both.

As described in more detail below, the amounts by which the seat 20 are moved forward—in the first stage or the second stage—may vary depending on a number of factors, such as the physique of the occupant of the seat 20 and the current position of the seat 20 relative to the steering wheel or dashboard of the vehicle 10. Taking these criteria into account, embodiments may move the seat 20 forward by a predetermined amount that is less in some situations and greater in other situations—e.g., the amounts ($A_1$), ($A_2$), or both may be reduced if the occupant of the seat 20 is particularly large, or the seat 20 is positioned very close to the steering wheel or dashboard. Similarly, if the position of the seat 20 is already relatively far from the seat 24, one or both of the amounts ($A_1$), ($A_2$) may be relatively small.

Figure 3A:
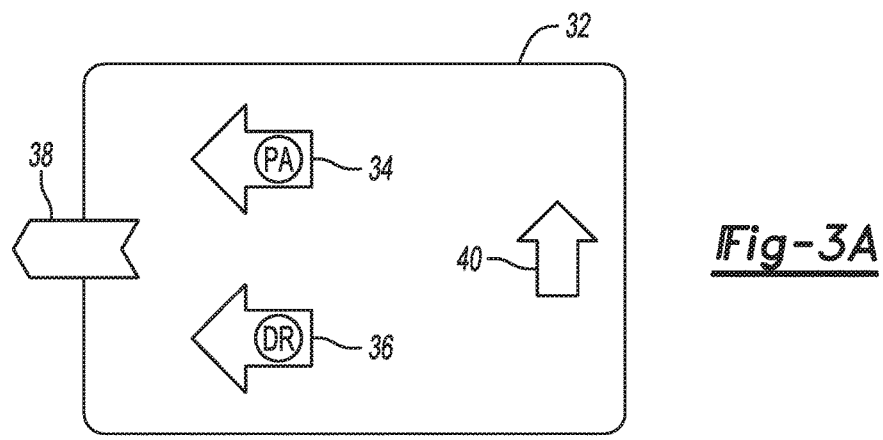
FIGS. 3A-3C show a method for positioning a seat arrangement in a vehicle in accordance with embodiments described herein when at least one of the seats has a non-standard orientation.
Figure 3B:
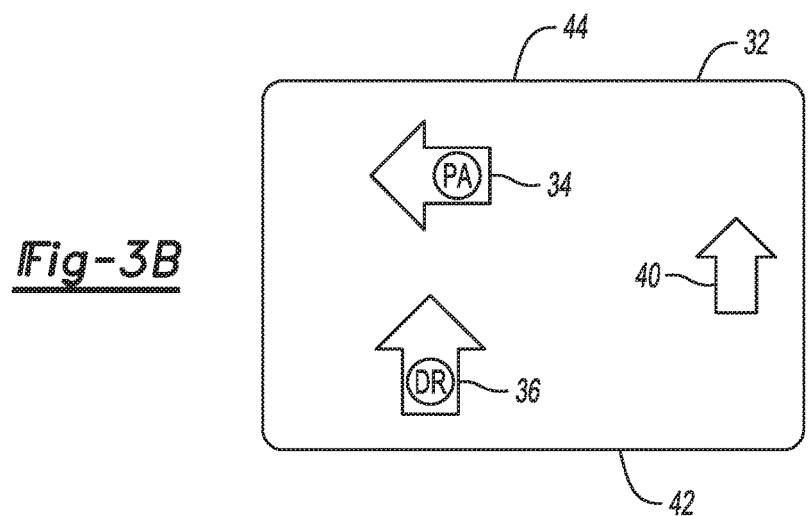
Figure 3C:
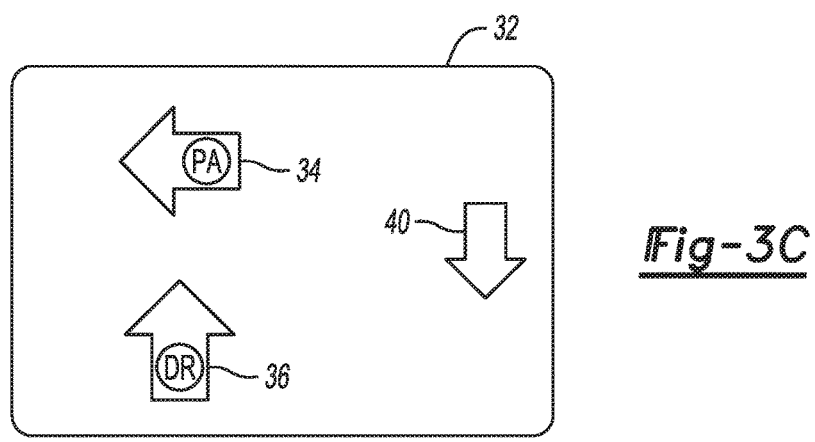

The embodiment shown in FIGS. 1 and 2 illustrates a situation in which both of the seats 20, 24 are in a standard orientation relative to the vehicle 10—i.e., both of the seats 20, 24 are facing forward toward the front 31 of the vehicle 10. Embodiments described herein may also be used with vehicles employing non-standard seat orientations, such as may be found in autonomous vehicles, or even chauffeur-driven vehicles where an occupant may be able to adjust the seat orientation to a non-forward-facing aspect. FIGS. 3A-3C illustrate an application of systems and methods described herein to a vehicle having at least one seat with a non-standard orientation.

As shown in FIG. 3A, a vehicle 32 includes a front passenger-side seat 34 and a front driver-side seat 36. Both of the seats 34, 36 are oriented forward relative to the vehicle 32, which is also the direction of travel of the vehicle 32, as indicated by the direction arrow 38. This is the orientation described above with regard to FIGS. 1 and 2, and embodiments of systems and methods described above may be implemented in the event of a rear-impact of the vehicle 32—which is an impact into the vehicle 32 from a direction behind the seats 34, 36. In contrast, in the embodiment shown in FIG. 3A, the direction of impact is from the driver's side, as indicated by the direction arrow 40. In this situation, neither of the seats 34, 36 are moved forward because the direction of impact is not from a direction behind either of the seats 34, 36.

As shown in FIG. 3B, the passenger-side seat 34 is still oriented in a forward direction, but the driver-side seat 36 is oriented to face the passenger-side seat 34. In this example, the driver-side seat 36 is rotated a full 90° from its standard, forward orientation. In other embodiments, it may be rotated only a portion of the way toward the passenger-side seat 34 or it may be rotated beyond 90° from its standard, forward orientation. As shown in FIG. 3B, the direction of impact is again from the driver's side, as indicated by the direction arrow 40, which is from a direction behind the seat 36. In this situation, the driver-side seat 36 may be moved forward in one or two stages, similar to that described above for the seat 20, when there is an indication of a likelihood of an impact from the driver's side 42. As described above, "forward" is the direction relative to the orientation of the seat 36 itself, rather than the orientation of the vehicle 32. This means that the driver-side seat 36 shown in FIG. 3B is moved "forward" when it is moved toward the passenger-side seat 34.

Although some of the criteria may be the same for the example shown in FIG. 3B and the examples described above with regard to FIGS. 1 and 2, some criteria may also be different. For example, there is no seat directly behind the driver-side seat 36 as is shown in FIG. 3B. There may be, however, first and second impact the zones defined outward from the driver's side 42 of the vehicle 32 that are similar to the first and second impact the zones (Z1) and (Z2) defined toward the rear of the vehicle 10 and illustrated in FIGS. 1 and 2. As shown in FIG. 3C, the driver-side seat 36 is again oriented toward the passenger-side seat 34; however, in this embodiment, the direction of impact is from the passenger's side 44 of the vehicle 32, as indicated by the direction arrow 40. Similar to the example shown in FIG. 3A, the driver-side seat 36 is not moved forward in this example, even though there is an indication of a likelihood of impact, because the impact is from the passenger's side 44.

Figure 4:
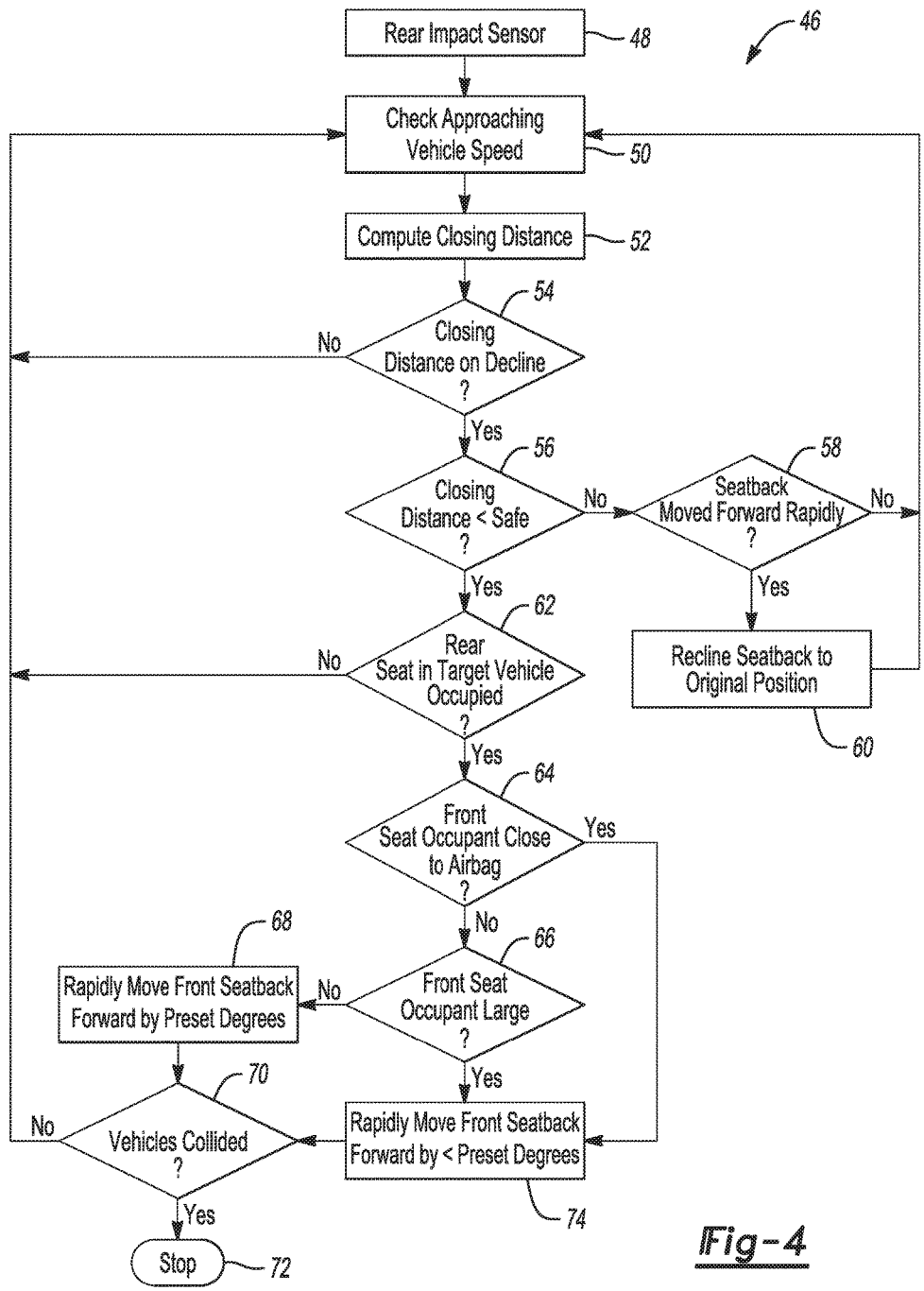
FIG. 4 shows a flowchart illustrating a method in accordance with embodiments described herein.

FIG. 4 shows a flowchart 46 illustrating the steps of a method in accordance with embodiments described herein. The steps of the method may be executed, for example, by a control system such as the control system 17, and for convenience, the elements illustrated and described in FIGS. 1 and 2 will be used for reference. At step 48 a rear impact sensor—which may be, for example, part of the sensor arrangement 14—provides an input, which may be processed by the control system 17. At step 50, the speed of the approaching vehicle is determined—this may be, for example, the speed of the approaching vehicle 22. At step 52 the closing distance between the vehicle 22 and the vehicle 10 is computed. At decision block 54 it is determined whether the closing distance is decreasing; if it is not, the method loops back to step 50. If, however, it is determined at step 54 that the closing distance between the vehicle 22 and the vehicle 10 is decreasing, then the method moves to step 56 where it is determined whether the closing distance is less than a distance that may be considered "safe"—i.e, the criteria examined indicate a likelihood of impact.

If at step 56 it is determined that the closing distance is not less than some predetermined "safe" distance, then at step 58, it is determined whether or not the seat had previously been moved forward in accordance with systems and methods described herein. If it had not, then the method loops back to step 50. If, however, it is determined at step 58 that the seat had previously been moved forward in accordance with embodiments of the positioning system and method such as those described herein, then the seat is moved back to its original position as shown in step 60. For the embodiment illustrated and described in conjunction with FIGS. 1 and 2, where it was the seat back 26 that had been moved forward, the seat back 26 will be moved back to its original position when step 60 is executed.

If it is determined at step 56 that the closing distance is less than some distance considered "safe", then the method moves to step 62 where another determination is made. At step 62 is determined whether the seat directly behind the seat being considered for repositioning—i.e., the target seat—is occupied. In FIGS. 1 and 2, this is a determination as to whether the seat 24 is occupied while the seat 20 is being considered for repositioning. In this embodiment, the method loops back to step 50 if it is determined that the rear seat is not occupied. If, however, it is determined that the rear seat is occupied, the method moves to step 64 where another criterion is examined. More specifically, at step 64 it is determined whether the seat 20 is close to an airbag, such as may be disposed in the steering wheel or dash board. If it is not, then the method moves to step 66, where it is determined whether the occupant of the seat 20 is large—i.e.

one of the criterion is related to the physique of the occupant. If the occupant is determined to be not large, the method moves to step 68, where the seat back 26 is moved forward by a predetermined amount—for example, the amount ($A_1$).

At decision block 70, it is determined whether or not the vehicles 10, 22 have actually collided, and if not, the method loops back to step 50. If it is determined at step 70 that the vehicles have collided, then the method stops at step 72. Returning to step 66, if it is determined that the occupant of the seat 20 is considered large, then at step 74 the seat back 26 will be moved forward but by some amount less than the full forward movement used at step 68—e.g., something less than ($A_1$). Similar to the determination as to whether the front seat occupant as close to the airbag, and other determinations made within embodiments described herein, different parameters can be used for different situations. More specifically, different implementations and different vehicles may have different parameters for whether a front seat occupant is considered close to the airbag or whether a front seat occupant is considered large. These parameters may be preprogrammed into a control system, such as the control system 17, and may be different for different applications.

Figure 5A:
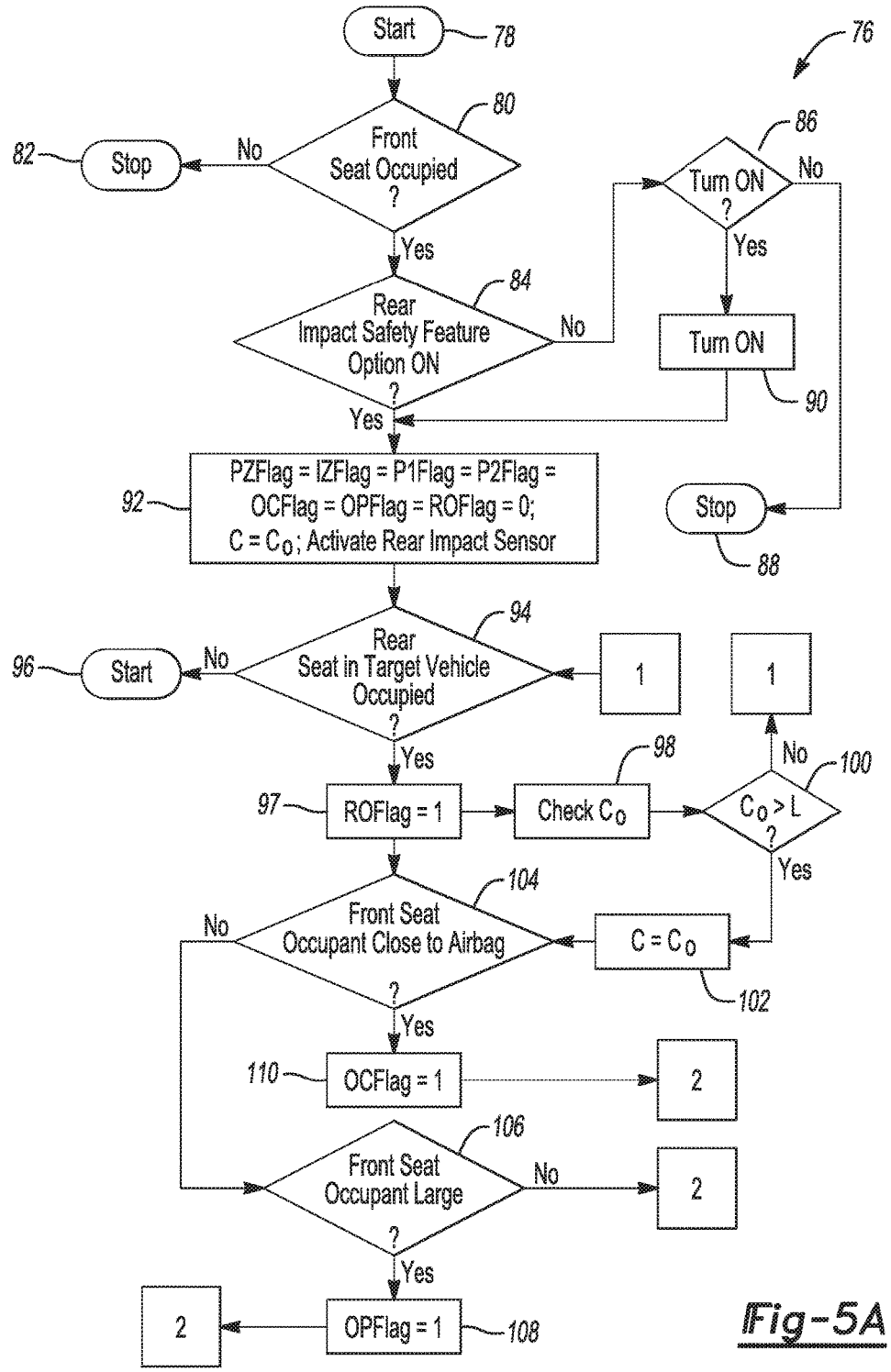
FIG. 5A shows a first portion of a flowchart illustrating a method in accordance with embodiments described herein.

FIG. 4 illustrates a relatively simple implementation of systems and methods for repositioning a vehicle seat. FIGS. 5A and 5B show a flowchart 76 illustrating a somewhat more complex method, which may be implemented by a control system, such as the control system 17. For purposes of the flowchart 76, the following parameters are defined in Table 1. Many of the parameters illustrated in Table 1 represent software flags that may be turned ON or OFF based on certain predetermined criteria or inputs from various sensors, and may be used to achieve a desired result within an implementation of the system and method.

TABLE 1

L = X deg (Full Fwd Limit)
Co = Original Bk Angle
C = Current Bk Angle
P = Preset Angle = Y deg (belt payout assumed as required)
PZFlag = 0 Veh not in Potential Impact zone
PZFlag = 1 Veh in Potential Impact zone
IZFlag = 0 Veh not in Imminent Impact zone
IZFlag = 1 Veh in Imminent Impact zone
P1Flag = 0 Seatback moved fwd by 0 deg
P1Flag = 1 Seatback moved fwd by P deg
P2Flag = 0 Seatback moved fwd by 0 deg
P2Flag = 1 Seatback moved fwd by 2P deg
OCFlag = 0 Occupant Not Close to Steering
OCFlag = 1 Occupant Close to Steering
OPFlag = 0 Occupant Not Large
OPFlag = 1 Occupant Large
ROFlag = 0 Rear Seat Not Occupied
ROFlag = 1 Rear Seat Occupied The method starts at block 78, and a determination is made at step 80 as to whether the front seat is occupied. If it is not, the method stops as indicated by block 82. If the front seat is occupied, the method moves to step 84, where a determination is made as to whether a "rear impact safety feature option is ON". The rear impact safety feature option, may be, for example, any of the systems and methods described herein, which may also have an option to turn them ON or OFF as desired, for example, by activating or deactivating a manual override. This option may be manually controllable by a vehicle occupant, or it may be completely automated and based on criteria preprogrammed within a control system of the vehicle. If at step 84, it is determined that the option has not been turned ON, then the method moves to step 86 where the decision is made as to whether it should be turned ON. As noted above, this may be based on criteria preprogrammed into a control system such as the control system 17, and if these criteria are not met, or at least some of them are not met, the method stops as indicated by block 88.

If the decision is made that the option should be turned ON, then it is turned ON at step 90. Although steps 86 and 90 are described above as part of an automated system and method, other embodiments may allow one or both of the steps to be implemented manually by a vehicle occupant. At step 92 a number of flags are set to zero—i.e., the system is initialized—and a rear impact sensor, such as may be part of the sensor arrangement 14, is activated. A decision is made at step 94 as to whether the seat directly behind the target seat is occupied, and if not, the method starts-over as indicated by block 96. If the rear seat is occupied, then the method moves to step 97 where the appropriate flag is set to "1". In the embodiment illustrated in FIGS. 5A and 5B, the system and method are implemented by moving the seat back forward, similar to that as described above in conjunction with FIGS. 1 and 2. It is understood, however, that in other embodiments the seat may be moved longitudinally forward, or some combination of longitudinal movement and angular seat back movement may occur.

At step 98 the original angle of the seat back is checked, and at step 100, it is determined whether this angle is greater than a predetermined full-forward limit. As shown in Table 1, the full-forward limit is indicated by "X degrees", and in some embodiments this may be approximately 5°. If it is not greater than the full-forward limit, the method moves to a first transfer block, indicated by the numeral "1" in the block, and which is hereinafter referred to as "transfer block 1". As shown in the flowchart 76, transfer block 1 also forms an input into the decision block 94. If at step 100 it is determined that the original angle of the seat back is greater than the predetermined limit, then the current angle of the seat back is set within the program to equal the original seat back angle—this is shown at step 102. At step 104 it is determined whether the front seat occupant is close to an airbag—e.g., in a steering wheel or dashboard—and if not, the method moves to step 106 where it is determined if the front seat occupant is large.

If at step 106 it is determined that the front seat occupant is large according to the predetermined criteria, then the appropriate flag is turned ON at step 108, and the method moves to a second transfer block, indicated by the numeral "2", which is hereinafter referred to as "transfer block 2". If at step 106 it is determined that the front seat occupant is not large according to the predetermined criteria, the method moves to transfer block 2 without turning-on the software flag. If at step 104 it is determined that the front seat occupant is close to the airbag according to the predetermined criteria, then the appropriate flag is also turned ON at step 110, and the method moves to transfer block 2.

Turning to the remainder of the flowchart 76 as shown in FIG. 5B, step 112 begins from transfer block 2—i.e., steps 106, 108, or 110 may transfer directly into step 112. At step 112, the approaching vehicle's (AV) speed is determined, and at step 114 the closing distance to the target vehicle is determined—e.g., the closing distance of the approaching vehicle 22 is compared to the vehicle 10 as illustrated in FIGS. 1 and 2. At step 116 it is determined whether the closing distance is decreasing. If it is not, a determination is made at step 118 as to whether the approaching vehicle is within the first or second impact zones—e.g., the potential impact zone or the imminent impact zone. If it is in either impact zone, the method moves to transfer block 2, and it starts over from step 112. A determination is made at step 120 as to whether the seat back had been previously moved forward in accordance with systems and methods described herein; this is indicated by the status of the software flags shown in step 120. If the answer is "No" the method returns to the start as shown by block 122, which is the same "start" position indicated by block 96 in FIG. 5A. If, however, the answer is "Yes" the seat back is returned to its original reclined position as shown at step 124. The method then moves back to the start as shown in block 122.

Returning to step 116, if it is determined that the closing distance is decreasing, the method moves to step 126 where a determination is made as to whether the approaching vehicle is within the "imminent" impact zone—i.e., the second impact zone. If it is, it is then determined at step 128 as to whether the seat back has been moved forward by some predetermined angle, indicated in Table 1 as "2P". If it has, then the method moves to a fourth transfer block indicated by the numeral "4", which is hereinafter referred to as "transfer block 4". If it has not, then the appropriate flags are set at steps 130 and 132—see Table 1 for reference—and then a determination is made at step 134 as to whether the current angle of the seat back is greater than or equal to the full-forward limit. If it is not, the method moves to transfer block 2; however, if it is, the method moves to step 136 where two additional determinations are made. Specifically, at step 136 it is determined whether the occupant is close to the steering wheel or the occupant is large. If the answer to both of these is "No", then the method moves to step 138 where it is determined whether the difference between the current seat back angle (C) and the full-forward limit (L) is greater than some predetermined amount. In at least some embodiments, the value of "P" may be approximately 9°, which makes the determination at step 138 a decision as to whether the seat-back angle difference is greater than or equal to approximately 18°. If it is not, the method moves to a third transfer block, indicated by the numeral "3", and which is hereinafter referred to as "transfer block 3".

If it is determined at step 138 that the difference is greater than or equal to "2P", then the method moves to step 140 where it is determined whether the seat back had previously been moved forward by a predetermined amount. If it had not been previously moved forward by the predetermined amount, the method moves to step 142 where the current seat back angle is set to be the current seat back angle minus "2P". Stated another way, the seat back angle is changed—i.e., moved forward—by an amount equal to "2P". Then, the appropriate software flag is set at step 144, and it is determined at step 146 whether the vehicles have collided. If they have not, the method moves to transfer block 2, but if they have, the method stops as indicated by block 148, which is the same "stop" position indicated by block 82 shown in FIG. 5A. It is worth noting that an input for step 146 is transfer block 4, which means that any of the steps that moved to transfer block 4 may provide inputs into block 146.

Returning to step 140, if it is determined that the seat back had previously been moved forward by a predetermined amount, the method moves to step 150 where the seat back angle is moved forward by an amount equal the preset angle indicated by "P". The appropriate software flag is then set at step 152, and the method moves to step 174 as described in more detail below. Returning to decision block 126, if it is determined that the approaching vehicle is not within the "imminent" impact zone, the method moves to step 154 where the appropriate software flag is set. At step 156 it is determined whether the approaching vehicle is within the first or "potential" impact zone. If it is not, the appropriate software flag is set at step 158, and the method moves to transfer block 2. If at step 156 it is determined that the approaching vehicle is within the "potential" impact the zone, then a determination is made at step 160 as to whether the seat back had previously been moved forward by the predetermined amount "P". If it had, the method moves to transfer block 2, but if it had not, then the method moves to steps 162 and 164 where the appropriate software flags are set.

At step 166 it is determined whether the current angle of the seat back is greater than or equal to the full-forward limit. If it is not, the method moves to transfer block 2; however, if it is, a determination is made at step 168 as to whether the seated occupant is close to the steering wheel or is large. If the answer to either of these is "Yes", the method moves to transfer block 2.7. As shown in FIG. 5B, the method also moves to transfer block 2.7 if the answer to the determination at step 136 is positive.

Returning to step 168, if the result of the determination is negative, the method moves to step 178, where another determination is made—specifically as to whether the difference between the current angle of the seat back and the full-forward limit is greater than or equal to a predetermined amount, which in this embodiment is the value "P". As shown in FIG. 5B, transfer block 3 provides an input into the determination at step 178 so that, for example, a negative determination at step 138 may lead directly into step 178. If the determination at step 178 is positive, the method moves to step 172 where the seat back angle is moved forward by an amount equal to the predetermined value of "P". If, however, the determination at step 178 is negative, the method moves to step 180, where the current seat back angle is changed to an angle of "x", which is equal to the current seat back angle "C" minus the full-forward limit "L". The output from step 180 is step 176 where the appropriate software flag is set, and the method moves from step 176 to decision block 174.

At decision block 174, a determination is made as to whether the vehicle is within the imminent impact zone, as indicated by "IZFlag=1". If it is not, the method moves to transfer block 2, which, as described above, provides an input for step 112. If, however, the vehicle is determined to be within the imminent impact zone as indicated by the software flag, the method moves to transfer block 4, which provides an input for decision block 146. As described above, a positive result from either decision block 168 or decision block 136 leads to the transfer block 2.7. As shown in the flowchart 76, the transfer block 2.7 provides an input into step 182 where a decision is made as to whether the seat back has been moved forward by "P" degrees. If it has, the method moves to transfer block 4, but if it has not, then the method moves to transfer block 2.9, which provides an input into decision block 170. At step 170, a determination is made as to whether the current seat back angle minus the full-forward limit is greater than or equal to a predetermined angle, which in this embodiment is "2P". If it is, then the method moves to step 172, which is described above; if it is not, the method moves from step 170 to transfer block 3. Although at least some of the steps illustrated and described in conjunction with FIGS. 4 and 5 appear in a particular order, systems and methods in accordance with embodiments described herein may execute one or more of these steps in a different order, and some of the steps may be substituted for other steps or omitted entirely, and additional steps may be used in place of or in conjunction with the steps illustrated and described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for positioning a seat arrangement in a vehicle, comprising:
    moving the seat arrangement forward when a seat directly behind the seat arrangement is occupied and at least one criterion indicates a likelihood of an impact into the vehicle from behind the seat arrangement; and
    not moving the seat arrangement forward when the seat directly behind the seat arrangement is not occupied and the at least one criterion indicates the likelihood of an impact into the vehicle from behind the seat arrangement.

2. The method of claim 1, wherein the at least one criterion indicating a likelihood of an impact into the vehicle from behind the seat arrangement includes at least one criterion indicating that an approaching object is within a first impact zone and at least one criterion indicating that the approaching object is with a second impact zone closer to the vehicle than the first impact zone.

3. The method of claim 2, wherein moving the seat arrangement forward includes:
    moving the seat arrangement forward a first time when the approaching object is within the first impact zone, and
    moving the seat arrangement forward a second time when the approaching object has passed through the first impact zone and is within the second impact zone.

4. The method of claim 1, wherein moving the seat arrangement forward includes moving the seat arrangement forward by a predetermined amount, and the predetermined amount is based at least in part on at least one of a physique of an occupant of the seat arrangement or a current position of the seat arrangement.

5. The method of claim 1, wherein the seat arrangement includes a seat back pivotally attached to a seat cushion, and moving the seat arrangement forward includes pivoting the seat back forward relative to the seat cushion.

6. The method of claim 1, further comprising moving the seat arrangement forward when the seat arrangement is facing a first side of the vehicle and at least one criterion indicates a likelihood of an impact into the vehicle at a second side of the vehicle opposite the first side of the vehicle.

7. The method of claim 6, further comprising not moving the seat arrangement forward when the seat arrangement is facing the first side of the vehicle and at least one criterion indicates a likelihood of an impact into the vehicle at a side other than the second side of the vehicle.

8. A method for positioning a seat arrangement in a vehicle, comprising:
    moving the seat arrangement forward by a first amount when a plurality of criteria are met, including at least one criterion related to occupancy of a seat directly behind the seat arrangement and at least one criterion related to a likelihood of an impact into the vehicle from behind the seat arrangement; and
    not moving the seat arrangement forward by the first amount when at least one of the criteria is not met.

9. The method of claim 8, wherein the criteria further include at least one criterion related to a physique of an occupant of the seat arrangement and at least one criterion related to a current position of the seat arrangement, the method further comprising moving the seat forward by a second amount less than the first amount based at least in part on at least one of the physique of the occupant or the current position of the seat arrangement.

10. The method of claim 8, wherein the at least one criterion related to occupancy of a seat directly behind the seat arrangement includes an assumption that the seat directly behind the seat arrangement is occupied.

11. The method of claim 8, wherein at least one of the criteria is not met when a manual override option is activated.

12. The method of claim 8, wherein the at least one criterion related to a likelihood of an impact into the vehicle from behind the seat arrangement includes at least one criterion related to an approaching object being within a first impact zone and at least one criterion related to the approaching object being with a second impact zone closer to the vehicle than the first impact zone, the method further comprising initially moving the seat arrangement forward based at least in part on the approaching object being within the first impact zone; and further moving the seat arrangement forward based at least in part of the approaching object being within the second impact zone.

13. The method of claim 8, wherein the at least one criterion related to a likelihood of an impact into the vehicle from behind the seat arrangement includes at least one criterion related to an approaching object being within a first impact zone and at least one criterion related to the approaching object being with a second impact zone closer to the vehicle than the first impact zone, the method further comprising:
 initially moving the seat arrangement forward based at least in part on the approaching object being within the first impact zone;
 moving the seat arrangement forward, after initially moving the seat arrangement forward, based at least in part on the approaching object being within the second impact zone for at least a predetermined amount of time; and
 not moving the seat arrangement forward, after initially moving the seat arrangement forward, when the approaching object is within the second impact zone for less than the predetermined amount of time.

14. The method of claim 8, further comprising moving the seat arrangement forward based at least in part on the seat arrangement facing a first side of the vehicle and an indication of a likelihood of an impact into the vehicle at a second side of the vehicle opposite the first side of the vehicle.

15. The method of claim 14, further comprising not moving the seat arrangement forward based at least in part on the seat arrangement facing the first side of the vehicle and an indication of a likelihood of an impact into the vehicle on a side other than at the second side of the vehicle.

16. A system for positioning a seat arrangement in a vehicle, comprising:
 a control system including at least one controller and configured to control a position of the seat arrangement based on a plurality of inputs, including moving the seat arrangement forward by a first amount based on at least one input indicative of occupancy of a seat directly behind the seat arrangement and at least one input indicative of a likelihood of an impact into the vehicle from behind the seat arrangement.

17. The system of claim 16, wherein the inputs include at least one input related to a physique of an occupant of the seat arrangement and at least one input related to a position of the seat arrangement, and
 wherein the control system is further configured to move the seat arrangement forward by a second amount less than the first amount based at least in part on the at least one input related to the physique of the occupant and the at least one input related to the position of the seat arrangement.

18. The system of claim 16, wherein the inputs include at least one input related to an approaching object approaching the vehicle from behind the seat arrangement being within a first impact zone, and at least one input related to the approaching object being within a second impact zone closer to the vehicle than the first impact zone, and
 wherein the control system is further configured to initially move the seat arrangement forward based at least in part on the approaching object being within the first impact zone, and to further move the seat arrangement forward based at least in part of the approaching object being within the second impact zone.

19. The system of claim 16, wherein the control system is further configured to move the seat arrangement forward based at least in part on at least one of the inputs indicating that the seat arrangement is facing a first side of the vehicle and a least one of the inputs indicating a likelihood of an impact into the vehicle at a second side of the vehicle opposite the first side of the vehicle.

20. The system of claim 19, wherein the control system is further configured to not move the seat arrangement forward based at least in part on at least one of the inputs indicating that the seat arrangement is facing a first side of the vehicle and a least one of the inputs indicating a likelihood of an impact into the vehicle at a side other than the second side of the vehicle.

21. The system of claim 16, wherein the control system is further configured to disengage an accelerator pedal of the vehicle when the seat arrangement is moved forward by the first amount.

* * * * *